United States Patent [19]

Straubel et al.

[11] 4,348,895

[45] Sep. 14, 1982

[54] METHOD FOR ANGULARLY CORRECT MOUNTING OF A FUEL INJECTION PUMP ON AN INTERNAL COMBUSTION ENGINE

[75] Inventors: Max Straubel; Reinhard Schwartz; Ernst Ritter; Ilija Djordjevic, all of Stuttgart; Reinhard Döll, Böblingen, all of Fed. Rep. of Germany

[73] Assignee: Robert Bosch GmbH, Stuttgart, Fed. Rep. of Germany

[21] Appl. No.: 213,712

[22] Filed: Dec. 5, 1980

[30] Foreign Application Priority Data

Dec. 6, 1979 [DE] Fed. Rep. of Germany ....... 2949018

[51] Int. Cl.[3] .......................................... G01M 15/00

[52] U.S. Cl. .................................................. 73/119 A

[58] Field of Search .................. 73/119 A, 117.3, 118; 123/343

[56] References Cited

U.S. PATENT DOCUMENTS 4,023,403 5/1977 Smith ................................ 73/119 A 4,167,926 9/1979 Le blanc et al. ................ 123/495 X

*Primary Examiner*—Jerry W. Myracle

*Attorney, Agent, or Firm*—Edwin E. Greigg

[57] ABSTRACT

A method is proposed in which the injection pump, having been adjusted in terms of the supply quantity and of the supply onset, is provided on a test bench, before being mounted on the internal combustion engine, with an electric pulse transducer, whose mounted position is marked on the injection pump. The pump may also be corrected, at a fixed test rpm, to a set-point value fixed relative to the supply onset signal by means of measuring the signal distance between the supply onset signal of a signal transducer measuring the dynamic supply onset and the rotary-position signal of the pulse transducer. The injection pump, with the camshaft rotated into the rotary position associated with the dynamic supply onset, is mounted on the engine which has been brought with its crankshaft into the associated working position. For testing and if needed correcting the mounted position of the injection pump on the engine, only the signal distance between the rotary-position signal and a dead-center signal of a dead-center transducer secured on the engine is tested and corrected if needed to a fixed set-point value. This measurement can be performed with a conventionally available ignition angle testing device.

15 Claims, 6 Drawing Figures

METHOD FOR ANGULARLY CORRECT MOUNTING OF A FUEL INJECTION PUMP ON AN INTERNAL COMBUSTION ENGINE

BACKGROUND OF THE INVENTION

The invention is based on a method for the angularly correct mounting of a fuel injection pump on an internal combustion engine, especially a Diesel engine. The injection pump, having been adjusted in terms of the supply quantity, onset supply and camshaft location is mounted on the engine in a working position with the crankshaft.

For the angularly correct mounting of a fuel injection pump, embodied either as a series pump or as a distributor-type pump, on the associated internal combustion engine, the following method is used in the predominant number of cases: The camshaft of the injection pump is rotated into a rotary position corresponding to the onset of supply and is held fixed in this rotary position. This position is ascertained previously by the so-called "overflow method" and is indicated by a slash mark placed on the pump housing or on some revolving part which is firmly connected with the drive shaft. In the overflow method, the static supply onset of the injection pump, which is already preset in terms of its prestroke, is searched for; that is, with the pressure valve removed the pump suction chamber is placed under the pressure of fuel and the camshaft is slowly turned until such time as the pump piston, during its upward stroke, closes the intake bore and the fuel ceases to flow out. In this rotary position, the mark indicating the onset of supply is then placed on the pump. Before the injection pump is mounted on the engine, both the camshaft of the injection pump and the crankshaft of the engine are brought into their respective positions for supply onset as indicated by markings and the injection pump is then subsequently secured on the engine.

This known method is too imprecise for the stricter exhaust gas regulations of the present time, and in addition it has the serious disadvantage that the slash mark cannot be seen from the outside, or can be seen only quite poorly, if the pump is mounted with an end flange to the gear box of the engine. In this case, and also when there are very close tolerances for the onset of supply, it is necessary to search anew for the onset of supply once the injection pump has been mounted on the engine and then to correct the mounting of the pump. A further disadvantage of the known method is the difference between the static supply onset which is measured in the known method and the actual dynamic supply onset as it occurs during engine operation.

A method has been made known in German Offenlegunsschrift No.27 00 878 and corresponding U.S. Pat. No. 4,167,926, which enables the mounting of a fuel injection pump on the associated internal combustion engine while taking into consideration the dynamic onset of fuel supply. In this method, a strobe light is triggered at a fixed test rpm by means of the supply onset signal measured by an electric supply onset signal transducer, and with the aid of the strobe light the angular position of the camshaft of the injection pump can be read out on a revolving scale relative to a fixed pointer. The read-out angular position is engraved on a plate on the injection pump. Before the injection pump is mounted on the engine, the camshaft of the injection pump is rotated into the ascertained rotary position and then mounted on the appropriately prepared engine. This method involves the danger of errors in reading, and when a test is made as to whether the mounting on the engine is correct, a supply onset signal transducer must be used. However, since the same test conditions cannot be provided for the engine as exist on a test bench in the factory where the injection pumps are made, this method has the disadvantage that in addition to the differing test conditions, the expense for measurement appliances is very high.

OBJECTS AND SUMMARY OF THE INVENTION

The object of the invention is accordingly to simplify the method, to reduce the expense for measurement appliances, and to improve the precision of the method.

The method is disclosed for the angularly correct mounting of a fuel injection pump on an internal combustion engine, especially a Diesel engine. The injection pump, having been adjusted in terms of the supply quantity, onset supply and camshaft location, is mounted on the engine in a working position with the crankshaft.

The dynamic onset of supply by the injection pump is measured on the test bench under fixed test conditions and at a fixed test rpm by an electric supply onset signal transducer preferably located in the vicinity of one pump output. The supply onset signal obtained is then fed into an electronic evaluation circuit. A rotary-position signal triggered by an angle transducer mark which revolves with the camshaft of the injection pump, is also fed into the evaluation device by an electric pulse transducer which is fixed in position relative to the pump housing.

Within the evaluation device, the signal distance between the supply onset signal and the rotary-position signal is ascertained and then indicated. This signal distance, ascertained in the evaluation device, is marked on the injection pump or is corrected to a set-point value which has been fixed relative to the supply onset signal. The correction is realized by varying the relative rotary position between the pulse transducer and the associated angle transducer mark. Taking into consideration the signal distance, either marked or corrected to the fixed set-point value, the camshaft of the injection pump is rotated with the test bench shut off into the rotary position associated with the dynamic supply onset and is locked in this rotary position.

With the camshaft locked in the fixed rotary position, the injection pump is mounted on the internal combustion engine so that the crankshaft is brought into the appropriate working position associated with top dead center. If in accordance with characteristic d the signal distance between the supply onset signal and the rotary position signal is corrected to a set-point value which has been fixed relative to the supply onset signal, this correction being effected by means of varying the relative rotary position between the pulse transducer and the associated angle transducer mark, then the set-point value can be fixed such that it has the same value with all injection pumps, at least those of the same pump series, so a particular marking on the pump is not necessary.

As a result of the characteristics disclosed, advantageous modifications of and improvements are possible. Although it is also possible to detect and indicate the signal distance between the supply onset signal and the rotary position signal, which has been ascertained as a time signal, the test method is simpler and clearer if the signal distance is indicated in degrees of angle.

In order to perform the correction of the signal distance, the associated set-point value can be fixed in an advantageous manner as follows. Only the phase-advance angle of the dynamic supply onset of the injection pump which relates to top dead center of the engine crankshaft needs to be taken into account. The mounting position of the dead center transducer secured to the engine can also be shifted by a fixed angular amount, preferably 20° of crankshaft angle after top dead center. This fixation enables the use of a conventionally available ignition angle test device, used in Otto engines, which is calibrated to a mounting position of the dead-center transducer shifted by 20° of crankshaft angle, in order to be able to detect late ignitions occurring after top dead center as well. As a result of shortening the signal distance, the coincidence of the rotary-position signal and the dead-center signal during subsequent testing of the engine is avoided, because it is very difficult in measurement technology to detect negative angular values. This angular difference, preferably amounting to only 2° of crankshaft angle, in the testing and correction of the angularly correct mounting position of the injection pump on the engine, produces a like signal distance between the rotary-position signal emitted by the pulse transducer and by the injection pump and the dead-center signal associated with top dead center of the engine. This short distance enables a very narrow tolerance for this measurement value.

In the correction effected in accordance with the method, as described above, the angularly correct mounting position of the injection pump on the engine, it is advantageous that only the signals of the pulse transducer of the injection pump and of the dead-center transducer on the engine need to be compared. While in the case of the setpoint value fixed for the signal distance between the supply onset signal and the rotary-position signal should preferably amount to 2° of crankshaft angle. Correspondingly, the signal distance at the dead-center transducer on the engine should equal zero. Because no supply onset signal is required for the measurement at the engine, disturbing effects on the part of the injection equipment, of temperature and of rpm are substantially precluded.

As a result of locking the camshaft in the rotary position associated with the dynamic onset of supply, it is assured that the established rotary position of the camshaft will not change between the time it is established at the test bench and the time the pump is mounted on the engine. The signal distance between a zero-point signal of the crankshaft angle transducer and the rotary-position signal of the pulse transducer is stored in memory. With the test bench shut off, the crankshaft is rotated into the rotary position of the pulse transducer. As a result, subjective errors in measurement by the test mechanic are precluded. As a result of using a conventional available ignition angle test device in testing the mounting position of the engine; and by rotating the crankshaft so that the angle transducer mark is located in the central axis of a mounting aperature, it is possible to rediscover the fixed rotary position of the camshaft even without electronic test devices and without using a test bench.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
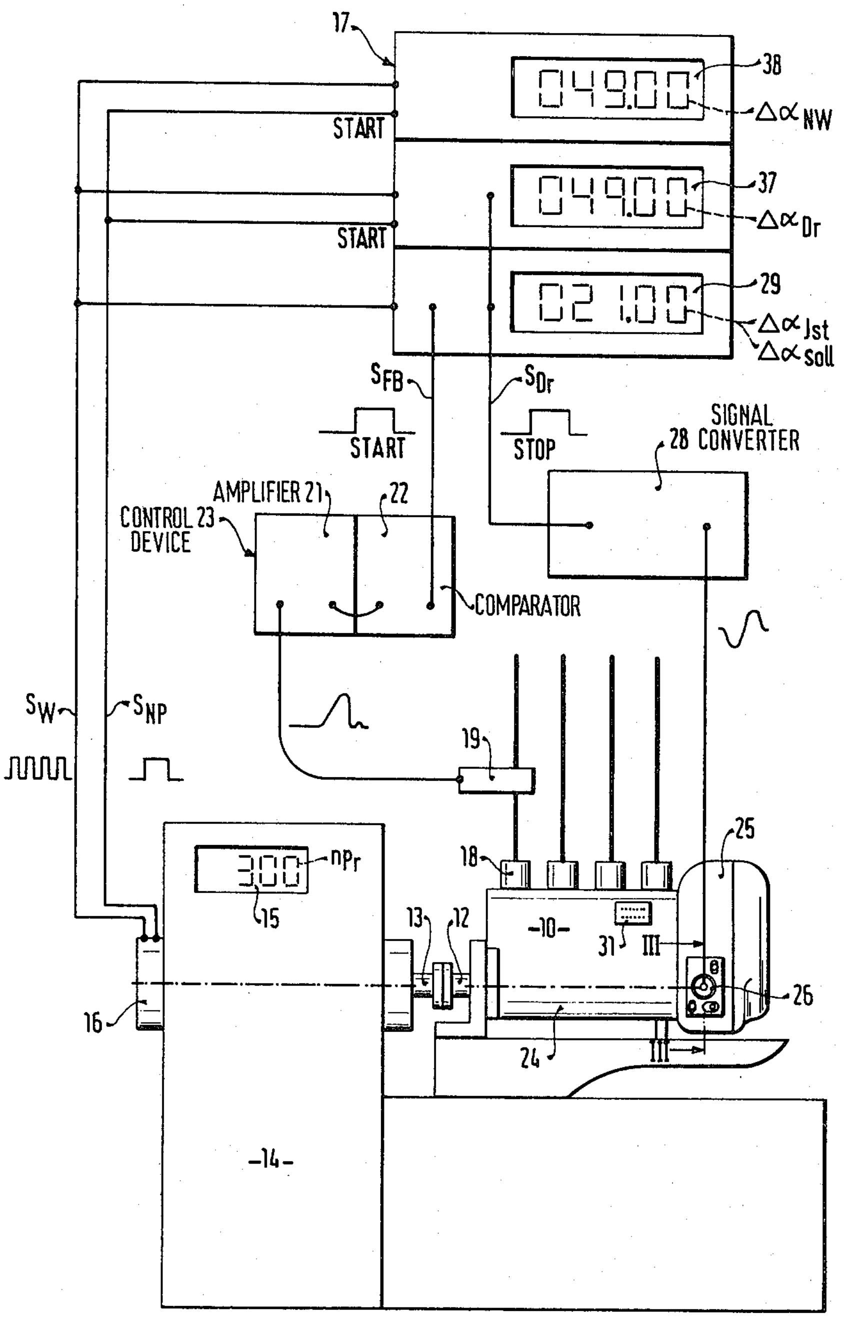
FIG. 1 is a simplified representation of the injection pump clamped on the test bench, with the associated measurement devices.

In order to prepare a fuel injection pump 10, which in the case of the exemplary embodiment is a series injection pump, for angularly correct mounting on an associated Diesel engine 11 (see also FIG. 2 in this connection), the injection pump 10 is coupled along with its camshaft 12 to a drive shaft 13 of a test bench 14 and secured there. The test bench 14, which is known per se, is equipped with a digital rpm indicator 15 and a camshaft angle transducer 16, which generates a zero-point signal $S_{NP}$ and 3600 angle signals $S_W$ per revolution (in other words, 10 angle signals per degree of cam angle) and feeds them into an electronic evaluation device 17.

The injection pump 10, which has already been set in the factory as to the supply quantity and the supply onset, is adjusted in terms of the static supply onset by means of the known adjustment of the pre-stroke. However, for the angularly correct mounting of the injection pump 10 on the engine 11, the dynamic supply onset of the injection pump 10, which differs from this static supply onset, is used. To this end, a supply onset signal $S_{FB}$ is measured by an electric supply-onset signal transducer 19 disposed near a first pump output 18 on the drive side, under fixed test conditions and at a fixed test rpm ($n_{Pr}$), such as 300 rpm. This supply onset signal is then, via a control device 23 comprising a measurement amplifier 21 and a comparator 22, furnished to the evaluation device 17. The injection pump 10 is further provided with an electric pulse transducer 26 (see also FIG. 3), which is positionally fixed relative to a pump housing 24 and secured in this exemplary embodiment on a governor housing 25. This pulse transducer 26 also furnishes a rotary-position signal $S_{Dr}$, which is triggered by an angular transducer mark 27 (see FIG. 3) revolving with the camshaft 12 of the injection pump 10, to the electronic evaluation device 17, after appropriate conversion in an electronic adapter 28 embodied as an electronic signal converter.

In a first counter 29 of the evaluation device 17, the signal distance $\Delta\alpha_{Ist}$ between the supply onset signal $S_{FB}$, delivered as a starting pulse, and the rotary-position signal $S_{Dr}$, delivered as a stop signal, is ascertained and indicated in digital form.

This signal distance $\Delta\alpha_{Ist}$ ascertained in the evaluation device 17 is either marked on the pump 10 on an identification plate 31 and then taken into consideration during the subsequent mounting on the engine at the associated working position $\alpha_{KW}$ (see FIG. 5) of the crankshaft 32 of the engine, or else it is corrected to a setpoint value $\Delta\alpha_{Soll}$, fixed in terms of the supply onset signal $S_{FB}$, by means of varying the relative rotary position between the pulse transducer 26 and the associated angle transducer mark 27. This correction is preferred, because of its advantages in the later method steps, and it is made the basis of the subsequent method steps. Various possibilities for the fixation of this setpoint value will be discussed in more detail below.

Subsequently, taking into consideration the signal distance $\Delta\alpha_{Ist}$ corrected to the fixed set-point value $\Delta\alpha_{Soll}$ and with the test bench 14 shut off, the camshaft 12 of the injection pump 10 is rotated into the position $\alpha_{NW}$ associated with the dynamic supply onset and is held fixed in this rotary position. In order to be able to rotate the camshaft 12 into the rotary position associated with the dynamic supply onset precisely, to within one-tenth of a degree, and then to hold it fixed in this position, the evaluation device 17 is equipped with a second counter 37 and a third counter 38. In the second counter 37, to this end, a signal distance $\Delta\alpha_{Dr}$ between the zero-point signal $S_{NP}$ of the camshaft angle transducer 16 of the test bench 14 and the rotary-position signal $S_{Dr}$ of the pulse transducer 26 secured on the injection pump 10 is ascertained, digitally indicated, and stored in memory. As indicated in FIG. 1, the zero-point signal $S_{NP}$ here acts as the starting signal, and the rotary-position signal $S_{Dr}$ acts as a stop signal. When the test bench 14 is shut off, the camshaft 21 of the injection pump 10 is rotated slowly, while the third counter 38 is observed, into a position such that the digital indication of the third counter 38 agrees with that of the second counter 37. Here, in the third counter 38 as well, the zero-point signal $S_{NP}$ serves as a reference mark or starting signal for the digital indication of the camshaft angle $\Delta\alpha_{NW}$.

Figure 4:
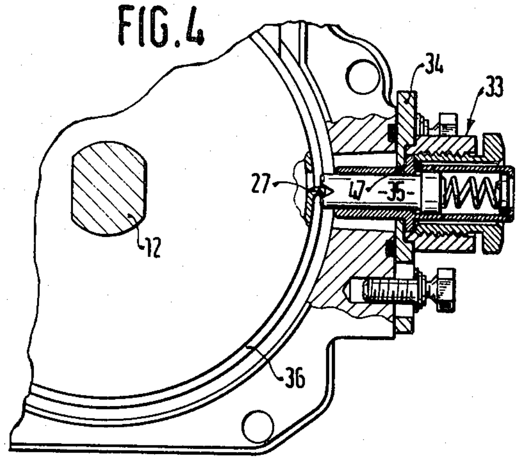
FIG. 4 is a section corresponding to that of FIG. 3, but with a locking apparatus in use.

This rotary position is maintained on the part of the camshaft 12 either through its own friction or, as shown in FIG. 4, the camshaft 12 is locked in this rotary position by a locking apparatus 33.

The locking apparatus 33 shown in FIG. 4, which is also described in the simultaneously filed U.S. patent application Ser. No. 213,711 (German priority patent application No. P 29 49 100.7), includes a holder element 35 in a mounting aperture 47 of a housing 34 for the locking apparatus 33. In order to block the rotary position associated with the dynamic onset of supply, the holder element 34 reaches over the angle transducer mark 27 and holds it fixed in position. This angle transducer mark 27 is embodied as an extension protruding from a revolving element 36 of the camshaft 12.

The injection pump 10 is now mounted, with its camshaft 12 locked in the fixed rotary position $\alpha_{NW}$ in accordance with the prescribed method steps, on the engine 11, which with its crankshaft 32 has been brought into an appropriate working position $\alpha_{KW}$ associated with top dead center TDC. See FIG. 5.

Figure 5:
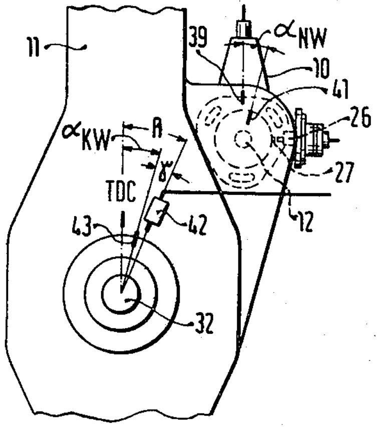
FIG. 5 is a partial view, looking in the direction of arrow A in FIG. 2, of the end side of the engine.

In FIG. 5, both the crankshaft 32 of the engine 11 and the camshaft 12 of the injection pump 10 are shown in the positions which they assume during mounting. Although when the locking apparatus 33 shown in FIG. 4 is used, no markings for supply onset are required on the injection pump 10. FIG. 5 includes two markings for the sake of more clearly illustrating the mounting position: a slash mark 39 attached to the housing and a supply onset mark 41 on some element revolving with the camshaft 12 (such as a clutch plate, not shown in further detail), which at the onset of supply is located opposite the slash mark 39. The predetermined rotary position $\alpha_{NW}$ of the camshaft 12 which is indicated in FIG. 5 corresponds to the signal distance $\Delta\alpha_{Ist}$ ascertained in the first counter 29 of the evaluation device 17. If the pump 10 is correctly adjusted, this actual signal distance is equal to the set-point value $\Delta\alpha_{Soll}$. The crankshaft 32 of the engine 11 is then in the associated working position $\alpha_{KW}$, which deviates by an angle $\beta$-$\gamma$ from the top dead center position TDC. This deviation is the consequence of the provision of a dead-center transducer 42 for the engine 11, the transducer 42 being mounted on the engine 11 at an angle after top dead center TDC of $\beta=20°$ of crankshaft angle (see FIGS. 2 and 5). In Otto-type engines, the position of the dead-center transducer 42 is assumed by the engine, because this corrected mounting position is necessary in such engines. Otherwise, negative angles would have to be dealt with in the case of late ignitions at the ignition angle test device occurring after top dead center. However, the transducer 42 will continue to be described as a "dead-center transducer" below, and a corresponding correction factor has been calibrated in the associated measurement devices. The angular difference $\gamma$, which may for example amount to 2° of crankshaft angle, is necessary so that in the subsequent testing of the mounting position the rotary-position signal $S_{Dr}$ picked up by the pulse transducer 26 at the injection pump will always be in advance of the dead-center signal $S_{OT}$ emitted by the dead-center transducer 42. The dead-center mark 43 is accordingly displaced by the angular difference $\gamma$ from the longitudinal axis of the dead-center transducer 42. This angular difference $\gamma$ can be adjusted by means of a measurement gauge engaging the dead-center transducer 42 and the dead-center mark 43 in a corresponding manner, so that no measurement errors can occur here.

Figure 2:
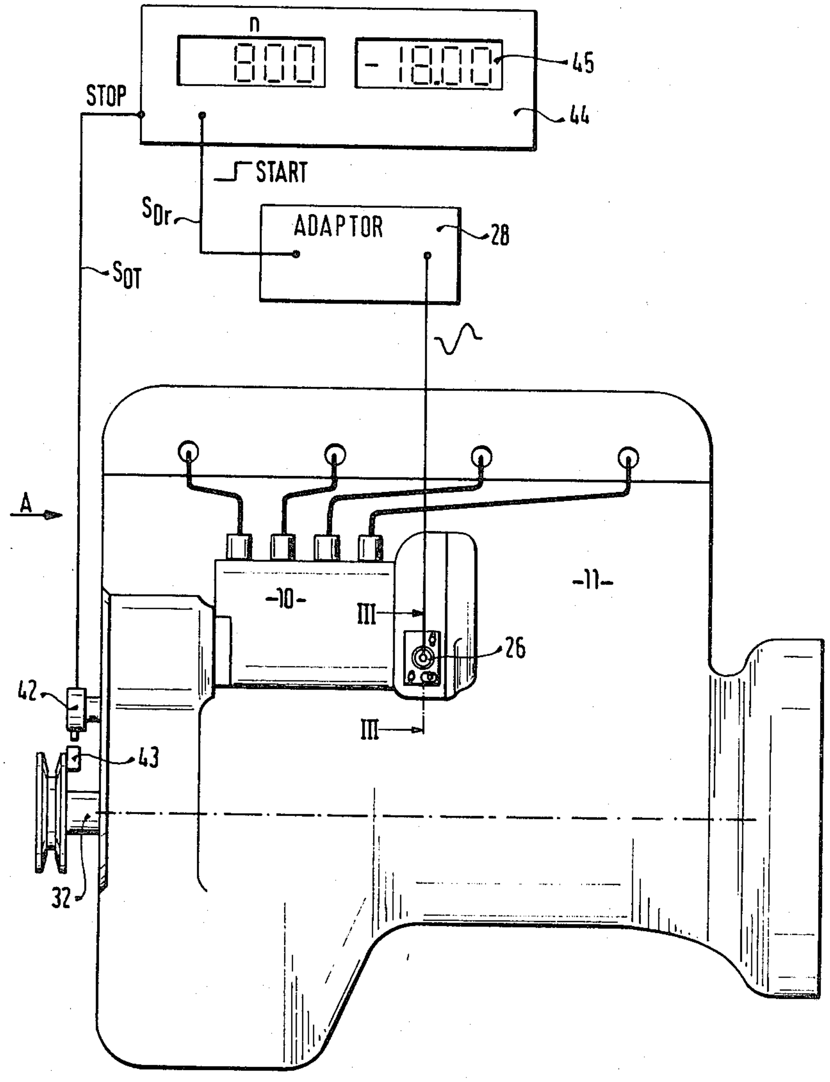
FIG. 2 shows the injection pump mounted on the engine with the measurement devices required for testing the mounted position.
Figure 3:
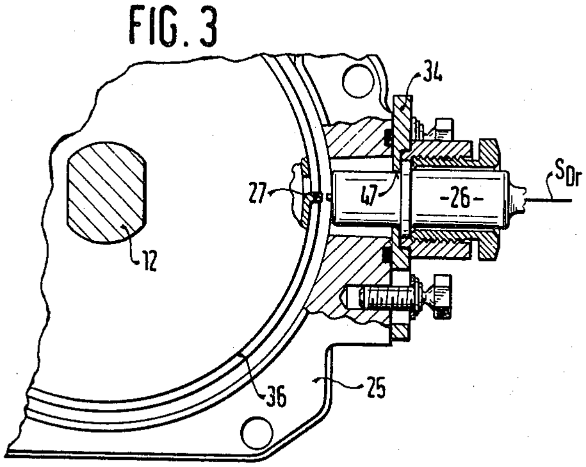
FIG. 3 is a section shown in part, taken along the line III—III in the pulse transducer also used in FIG. 1 or FIG. 2.

Once the injection pump 10 is secured on the engine 11, then the holder element 35 of the locking apparatus 33 is removed and replaced by a cover element (not shown) or, for the sake of a subsequent test of the mounted position, as shown in FIGS. 2 and 3, by the pulse transducer 26 inserted into the mounting aperture 47.

The correct mounting of the injection pump 10 on the engine 10 can now be undertaken, in order to test and if necessary correct the mounted position, in a simple manner by measuring the signal distance $\Delta S$, which has been fixed by means of the angular difference $\gamma$, between the rotary-position signal $S_{Dr}$ of the pulse transducer 26 and the dead-center signal $S_{OT}$ of the dead-center transducer 42. To this end, as shown in FIG. 2, the dead-center transducer 42 and the pulse transducer 26 are connected, with the electronic adapter 28 being interposed, to an electronic measurement device 44, for which a conventionally available ignition angle test device is advantageously used and the electronic adapter 28 being appropriately adapted. In the case presently being described, $-18°$ of crankshaft angle is shown by the digital indicator 45, because the ignition angle test device 44 subtracts the angular displacement $\beta=20°$ of crankshaft angle, as a correction factor, from the measurement value. Thus, with a signal distance $\Delta S$ of 2° of crankshaft angle, $-18°$ of crankshaft angle will be indicated. This angular indication is associated here with the engine rpm, a figure of 800 rpm, and rpmdependent changes of the signal are corrected in the electronic system of the test device 44.

With the method according to the invention, this angular value can always amount to a constant $-18°$ of crankshaft angle if, as described below in connection with FIG. 6, the signal distance $\Delta\alpha_{Ist}$ between the supply onset signal $S_{FB}$ and the rotary-position signal $S_{Dr}$ is fixed at the injection pump 10 to a constant set-point value $\Delta\alpha_{Soll}$ which takes into account the supply onset angle $\alpha_{FB}$, the angular displacement $\beta=20°$ of the dead-center transducer 42, and the angular difference $\gamma=\Delta S=2°$.

Figure 6:
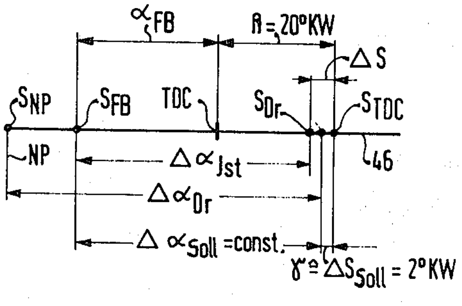
FIG. 6 is a diagram intended to illustrate the signals and associated angles pertaining to top dead center TDC of the engine.

In FIG. 6, in order to clarify the relationships between the individual signals and the angles, the signals and associated angles or angular distances named above are plotted on a horizontally placed angular axis 46 indicated by dot-dash lines. The supply onset signal $S_{FB}$ is located displaced by the angle $\alpha_{FB}$ before top dead center of the engine; the dead-center signal $S_{TDC}$ is emitted at the angle $\beta=20°$ of crankshaft angle after top dead center. The rotary-position signal $S_{Dr}$, when the injection pump 10 is correctly adjusted, is displaced toward top dead center before the dead-center signal TDC by the amount of a second set-point value $\Delta S_{Soll}$ of the signal distance $\Delta S$ or the angular difference $\gamma=2°$ crankshaft angle. In order to adjust the injection pump 10 on the test bench 14 with the appratus according to FIG. 1, the set-point value for the signal distance between $S_{FB}$ and $S_{Dr}$ is fixed at a value of $\Delta\alpha_{Soll}=\alpha FB+\beta-\gamma$. At a phase-advance angle for the dynamic supply onset of $\alpha_{FB}=12°$ of cam angle$=24°$ of crankshaft angle, the result is thus a set-point value $\Delta\alpha_{Soll}$ of 42° of crankshaft angle, which equals 21° of cam angle (in this connection, see the digital indication on the first counter 29 in FIG. 1). To further clarify the function, FIG. 6 also shows the zero-point signal $S_{NP}$ of the camshaft angle transducer 16 and the signal distance $\Delta\alpha_{Dr}$ between the zero-point signal $S_{NP}$ and the rotary-position signal $S_{Dr}$. The angular position of the zero-point signal $S_{NP}$ is efficiently disposed to such an extent before top dead center that a sufficient distance from the possible supply onset signals $S_{FB}$ is available. In the angular indications, care should be taken that in testing on the test bench according to FIG. 1 camshaft angles (NW) are measured, while in testing on the engine crankshaft angles (KW) should be measured; in a four-cycle engine, 1° of camshaft angle equals 2° of crankshaft angle.

Naturally, with an appropriate adaptation of the electronic measurement devices, the set-point values for the signal distances and the mounting positions of the corresponding transducers can be fixed for different angles from those discussed above, without departing from the concept of the invention, on the basis of which, with an appropriately fixed mounting position of the pulse transducer 26, only the signals of the dead-center transducer 42 and the pulse transducer 26 need to be compared in the test device 44 in the course of testing and correcting the mounted position on the engine.

If in measuring the signal distance $\Delta\alpha_{Ist}$ between the supply onset signal $S_{FB}$ and the rotary-position signal $S_{Dr}$ (see FIG. 1) this signal distance has been corrected to the set-point value $\Delta\alpha_{Soll}$, then in the course of some subsequent repair the fixed rotary position $\alpha_{NW}$ of the camshaft 12 can be readjusted again, even without the test device 44 and transducer signals $S_{Dr}$, $S_{OT}$. This is done by rotating the camshaft 12 into a position in which the angle transducer mark 27 is located precisely in the central axis of the mounting aperture 47 for the pulse transducer 26 or the holder element 35. With an adjustment of this kind, the engine can at least temporarily be put back into operation, while a precise testing and correction of the mounted position would then have to be undertaken by an appropriately equipped repair facility, with the aid of the measurement device apparatus shown in FIG. 2.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for ascertaining the correct angular mounting of a fuel injection pump having a housing and a camshaft with an angle transducer mark on an internal combustion engine having a crankshaft, the angular mounting system including a test bench having an electronic evaluation circuit, an electronic dynamic supply onset signal transducer, a rotary position transducer to detect camshaft position, a display, and a camshaft lock, said method comprising the steps of:

mounting the injection pump on the test bench, operating the injection pump at a test rpm, measuring the injection pump supply onset with the electric dynamic supply onset transducer which generates a signal indicative thereof, feeding the supply onset signal to the electronic evaluation circuit, revolving the camshaft and the angle transducer mark thereon, triggering the rotary position transducer by means of the angle transducer mark to generate a signal representing camshaft rotary position, feeding the rotary position signal into the electronic evaluation circuit, ascertaining a first signal distance between the rotary-position signal and the supply onset signal in the electronic evaluation circuit, indicating the signal distance on the injection display, marking the first signal distance on the injection pump, shutting off the test bench, rotating the camshaft to a predetermined position relative to the dynamic supply onset, taking into consideration the marked first signal distance, locking the camshaft, positioning the crankshaft at a predetermined distance from top dead center, mounting the injection pump on the internal combustion engine.

2. A method as defined in claim 1, further including a camshaft angle transducer, the steps further including:

generating camshaft angular position signals by the camshaft angle transducer, feeding these angular position signals together with the signals of the dynamic supply onset signal transducer and the rotary position transducer into the electronic evaluation circuit indicating the first signal distance on the display in angular degrees.

3. A method as defined in claim 2, further including a first counter, a second counter, having a memory and a third signal distance between the camshaft angle transducer signal and the rotary position signal, the steps further including:

indicating the first signal distance at test rpm in the first counter,
correcting the first signal distance by varying the position of the rotary position transducer relative to the injection pump housing,
indicating the third signal distance in the second counter,
storing the third signal distance in the second counter memory,
shutting the test bench off,
rotating the camshaft to the position stored in the second counter memory,
locking the camshaft in position.

4. A method as described in claim 3, further including a third counter, the steps further including:
generating a signal from the camshaft angle transducer to the third counter while the injection pump is still on the test bench,
indicating the camshaft on the third counter,
rotating the camshaft until the indication of the first counter equals the indication of the third counter,
locking the camshaft in position,
removing the injection pump from the test bench for mounting on the combustion engine.

5. A method as defined in claim 1, further including a crankshaft top dead center transducer, the steps further including:
generating a signal from the crankshaft top dead center transducer which indicates the crankshaft is at top dead center,
measuring a second signal distance between the rotary position signal and the crankshaft top dead center signal,
correcting the second signal distance to a fixed set-point value.

6. A method as defined in claim 5, further including an electronic adapter and an angle test device, the steps further including:
converting the rotary-position signal in the electronic adapter to a signal value,
utilizing the signal value in the angle test device as a measurement of the second signal distance.

7. A method as defined in claim 1, the steps further including:
rotating the camshaft until the dynamic supply onset is blocked before the camshaft is locked,
unblocking the dynamic supply onset after the injection pump is mounted on the combustion engine.

8. A method for ascertaining the correct angular mounting of a fuel injection pump having a camshaft with an angle transducer mark on an internal combustion engine having a crankshaft, the angular mounting system including a test bench having an electronic evaluation circuit, and electronic dynamic supply onset signal transducer, a rotary position transducer to detect camshaft position, a display, and a camshaft lock, said method comprising the steps of:
mounting the injection pump on the test bench,
operating the injection pump at a test rpm,
measuring the injection pump supply onset with the electric dynamic supply onset indicative thereof,
feeding the supply onset signal to the electronic evaluation circuit,
revolving the camshaft and the angle transducer mark thereon,
triggering the rotary position transducer by means of the angle transducer mark to generate a signal representing camshaft rotary position,
feeding the rotary position signal into the electronic evaluation circuit,
ascertaining a first signal distance between the rotary-position signal and the supply onset signal in the electronic evaluation circuit,
indicating the first signal distance on the display,
fixing set-point value relative to the supply onset signal,
correcting the first signal distance to the set point value by varying the relative rotary position between the rotary position transducer and the angle transducer mark,
shutting off the test bench,
rotating the camshaft to a predetermined position relative to the dynamic supply onset, taking into consideration the corrected first signal distance,
locking the camshaft,
positioning the crankshaft at a predetermined distance from top dead center,
mounting the injection pump on the internal combustion engine.

9. A method as defined in claim 8, wherein the dynamic supply onset has a phase-advance angle which is determined by crankshaft position, the steps further including:
corresponding the set-point value to the phase advance angle.

10. A method as defined in claim 9, further including a crankshaft top dead center transducer, wherein in fixing the set-point value of the steps further include:
mounting the crankshaft top dead center transducer at a fixed angular displacement from crankshaft top dead center in the direction of later-occuring signal emissions.

11. A method as defined in claim 10, the steps further including:
shortening the first signal distance by an angular difference equal to a predetermined percentage of crankshaft angle,
positioning the crankshaft in the direction of top dead center by an amount equal to the angular difference before mounting the injection pump on the combustion engine.

12. A method as defined in claim 10, the steps further including:
removing the holder element after mounting the injection pump on the combustion engine,
replacing the holder element with the rotary position transducer.

13. A method as defined in claim 8, wherein the revolving element is mounted on the camshaft and the angle transducer mark is embodied as an extension of the revolving element, and wherein the camshaft lock has a holding element, the steps further including:
rotating the camshaft until the dynamic onset is blocked before the camshaft is locked,
reaching over the angle transducer mark extention with the holder element to lock the camshaft,
unblocking the dynamic supply onset after the injection pump is mounted on the combustion engine.

14. A method as defined in claim 13, further including a cover element, the steps further including:
removing the holder element after mounting the injection pump on the combustion engine,
replacing the holder element with the cover element.

15. A method as defined in claim 8, further including a
mounting aperture in which the holder element is mounted, the steps further including:
rotating the camshaft until the angle transducer mark is aligned with the central axis of the mounting aperture to relocate the fixed rotary position of the camshaft.

* * * * *